(12) United States Patent
Li et al.

(10) Patent No.: US 11,046,598 B1
(45) Date of Patent: Jun. 29, 2021

(54) METHOD AND SYSTEM FOR TREATING HIGH SALINITY WATER

(71) Applicant: Jinzheng Eco-Technology Co. Ltd., Yantai (CN)

(72) Inventors: Yuebiao Li, Yantai (CN); Huijie Lin, Yantai (CN); Hui Li, Yantai (CN); Guoliang Li, Yantai (CN); Hongzhi Yan, Yantai (CN); Changyin Wan, Yantai (CN); Zhuo Zhang, Yantai (CN)

(73) Assignee: JINZHENG ECO-TECHNOLOGY CO. LTD., Yantai (CN)

(*) Notice: Subject to any disclaimer, the term of this patent is extended or adjusted under 35 U.S.C. 154(b) by 0 days.

(21) Appl. No.: 17/001,465

(22) Filed: Aug. 24, 2020

(30) Foreign Application Priority Data

Dec. 18, 2019  (CN) .......................... 201911305489.2

(51) Int. Cl.
   *C02F 1/52* (2006.01)
   *C02F 9/00* (2006.01)
   *C02F 1/26* (2006.01)

(52) U.S. Cl.
   CPC ................ *C02F 1/52* (2013.01); *C02F 1/265* (2013.01); *C02F 9/00* (2013.01); *C02F 2001/5218* (2013.01)

(58) Field of Classification Search
   CPC ....................................................... C02F 1/52
   See application file for complete search history.

(56) References Cited

U.S. PATENT DOCUMENTS

| 9,751,777 | B1 | 9/2017 | Bader |
| 2017/0029306 | A1 | 2/2017 | Ukai |
| 2017/0368476 | A1* | 12/2017 | Wallace ................... C02F 5/02 |

FOREIGN PATENT DOCUMENTS

| CN | 102459096 A | 5/2012 |
| CN | 105254099 A | 1/2016 |
| CN | 105753018 A | 7/2016 |
| CN | 107445328 A | 12/2017 |
| CN | 107814449 A | 3/2018 |

(Continued)

OTHER PUBLICATIONS

CN Search Report for CN201911305489.2.

*Primary Examiner* — Peter Keyworth
(74) *Attorney, Agent, or Firm* — J.C. Patents

(57) ABSTRACT

The present application is relate to a method and system for treating high salinity water, comprising the following steps: step 1, by a first membrane concentration unit, concentrating the raw water; step 2, with the assistance of a crystallization initiation unit, mixing the raw water concentrated, initiating crystallization by a seed crystal, and, discharging precipitated crystals; step 3, with the assistance of a crystallization termination unit, firstly, introducing the resulting water of the crystallization initiation unit, then, terminating crystallization, secondly, discharging precipitated miscellaneous salts; step 4, with the assistance of a mechanical filter unit, the liquid to discharged from the crystallization termination unit flowing through the mechanical filter unit, removing the residual seed crystal and flocculess; step 6, with the assistance of a second membrane concentration unit, the concentrated salinity water entering the second membrane concentration unit for concentration.

7 Claims, 1 Drawing Sheet

(56) References Cited

FOREIGN PATENT DOCUMENTS

| | | | |
|---|---|---|---|
| CN | 108623034 | A | 10/2018 |
| CN | 108823034 | A | 10/2018 |
| CN | 109205898 | A | 1/2019 |
| CN | 110386720 | A | 10/2019 |
| EP | 2671845 | A1 | 12/2013 |

* cited by examiner

METHOD AND SYSTEM FOR TREATING HIGH SALINITY WATER

CROSS-REFERENCE TO RELATED APPLICATION

This application claims the priority benefit of Chinese application serial No. CN201910322863.3 filed on Dec. 18, 2019, the content of which is hereby incorporated herein by reference in its entirety.

TECHNICAL FIELD

The present application relates to a method and system for treating high salinity water.

BACKGROUND OF THE PRESENT INVENTION

The waste gas produced in thermal power plants and coal chemical plants generally contains sulfur dioxide. A conventional treatment method is wet flue gas desulfurization (FGD) using limestone. The wastewater produced during FGD contains a high concentration of sulfate radical. Due to its high salt concentration and complex composition, FGD wastewater is one kind of industrial wastewater that is difficult to treat. Drainage water of some coal mines has high salt content, particularly high sulfate content, due to geological structure; direct discharging of such drainage water will cause pollution to the environment. The high salinity water with high sulfate content is generally treated by a chemical method (neutralization-flocculation-sedimentation), but the resulting water obtained after the chemical treatment still contains a high concentration of inorganic salts and other pollutants, and will pollute the environment once discharged. With the focus on environmental protection in China, the discharging of the FGD wastewater is getting more and more strictly or even zero liquid discharge (ZLD) requirements is required under some conditions.

Due to its advantages of high level of automation, small ground occupation, high treatment efficiency, stable water quality of the resulting water and the like, reverse osmosis technology is widely applied in the deep treatment of FGD wastewater and drainage water of coal mines. However, the high concentration of sparingly-soluble salts in the FGD wastewater and the drainage water of coal mines make it easy to form scales on the membrane surface during reverse osmosis process, thus reduce the treatment efficiency of the system and even cause the system to break down quickly. Therefore, it is imperative to develop a reverse osmosis membrane combined process that can ensure the long-term stable operation of a reverse osmosis system during the treatment of FGD wastewater.

CN105753018A disclosed a device and method for removing sodium sulfate in salinity water. In this method, a normal-temperature crystallization system and a membrane concentrator connected to the normal-temperature crystallization system are used. The normal-temperature crystallization system includes a buffer tank, a delivery pump, a heat exchanger and a normal-temperature crystallizer. This patent introduces a method of concentrating sodium sulfate in the salinity water to be supersaturated. The concentration polarization on the membrane element surface is reduced by adjusting the flow rate and pressure of the salinity water on the membrane surface during concentration by the membrane concentrator. Sodium sulfate crystals are obtained by a normal-temperature crystallization method. The purpose of this patent is to concentrate sodium sulfate in the salinity water to be supersaturated by the membrane concentrator, and then take a normal-temperature crystallization method to crystallize the supersaturated sodium sulfate. However, when this method is used to treat high-salinity wastewater in power plants and coal chemical plants, sparingly-soluble salts (e.g., calcium sulfate, magnesium hydroxide, calcium carbonate, magnesium sulfate, etc.) will form scales on the membrane surface, thus the membrane flux is reduced quickly or even the system will break down, and both the operation and maintenance cost of the system are increased.

CN108623034A disclosed a method and system for treating high-salinity wastewater. The system includes three parts, i.e., a normal-temperature crystallizer, a filter and a membrane concentrator. Part of the concentrated water from the membrane concentrator flows back to the normal-temperature crystallizer to mix with the raw water; thus improve the degree of supersaturation of insoluble inorganic salts in the raw water. In this method, by adding a softening agent and a flocculating agent in the normal-temperature crystallizer, some inorganic salts are precipitated in the form of miscellaneous salts; the miscellaneous salts contain many organic substances such as the flocculating agent. Most of the miscellaneous salts are useless due to their low purity, and should be treated as solid wastes. Meanwhile, since the insoluble inorganic salts are all treated by the softening agent and the flocculating agent, dosage of agents is high, causing a high cost of treatment process. This method is characterized in that crystallization and membrane separation are combined. However, in this method, during crystallization of inorganic salts, normal-temperature crystallization is initiated by directly adding the softening agent to and the flocculating agent, causing high agent consumption and the treatment cost. Moreover, the obtained miscellaneous salts is difficultly to be used as industrial salts due to their low purity, and can only be treated as solid wastes, which increasing the treatment cost.

In the existing patents involving the treatment of high-salinity wastewater, particularly in which involving the combination with membrane systems, the long-term stable operation of the membrane systems has not been fully considered. During the salt removal process, the economic indicators of the salt removal methods are not considered in most patents, a large amount of agents is used, while a large amount of miscellaneous salts is produced, and the treatment cost is high. Up to now, there is no cost-effective treatment method which can minimize the production of miscellaneous salts while obtaining pure crystal products on the basis of ensuring the stable operation of a membrane system.

SUMMARY OF THE PRESENT INVENTION

The problem to be solved by the present application is to provide a method and system for treating high salinity water.

To solve the above problems, the technical solution of the present application is as follows.

The purpose of the present application is to overcome the problem that for high salinity water, the existing treatment cost is high, high purity salt cannot be obtained, and the operation of the membrane system is unstable.

In order to solve the disadvantages of a large amount of non-additional-value solid precipitates brought by conventional softening and flocculation, high processing costs, and the problem of the scaling of the membrane system caused by direct concentration of the produced water in the triple tank, a method for treating high salinity water, firstly, introducing raw water after pretreated, and initiating crystallization of the raw water by crystal seeding method; then, discharging precipitated crystals, and introducing resulting water obtained after precipitating crystals to a next procedure; thirdly, introducing the resulting water to obtained after precipitating crystals, and performing miscellaneous salts precipitation treatment; subsequently, discharging precipitated miscellaneous salts, and introducing resulting water obtained after precipitating miscellaneous salts to a next procedure.

As a further improvement of the above technical solution:

Step 1: performing pretreatment by a first membrane concentration unit and concentrating the raw water until degree of supersaturation is more than 100%;

Step 2: with the assistance of a crystallization initiation unit, firstly, mixing and then introducing the raw water concentrated in the step 1 into the crystallization initiation unit; then, initiating crystallization by a seed crystal; and, discharging the precipitated crystals;

Step 3: with the assistance of a crystallization termination unit, firstly, introducing resulting water of the crystallization initiation unit obtained after the treatment of the step 2 into the crystallization termination unit; then, adding a softening agent and/or a flocculating agent to terminate crystallization and decreasing the degree of supersaturation to below 100%; secondly, discharging the precipitated miscellaneous salts;

Step 4: with the assistance of a mechanical filter unit, liquid discharged from the crystallization termination unit in the step 3 flowing through the mechanical filter unit, removing residual seed crystal and floccules, and discharging salinity water;

Step 6: with the assistance of a second membrane concentration unit, resulting water after treatment of the step 5 entering the second membrane concentration unit for concentration.

Step 5 is arranged between the step 4 and step 6, with the assistance of an online mixer, adding a scale inhibitor in an online mixing manner; firstly, adding the scale inhibitor into the salinity water discharged from the mechanical filter unit in the step 4; and then, executing the step 6.

In the step 6, the salinity water is concentrated by the second membrane concentration unit and then divided into at least two paths; one path of the salinity water is flow back before the crystallization initiation unit and mixed with the concentrated water from the first membrane concentration unit in the step 1, and the other path of the salinity water is discharged into a next-stage concentration system or an evaporation pool;

in the step 2, crystallization is initiated by a seed crystal, and the crystallization initiation unit comprises a seed crystal feeding port and a crystal stirring device; the particle size of the added seed crystal ranges from 200 to 1200 mesh; and, the crystal stirring device is a helical ribbon stirrer, an anchor stirrer, a turbine stirrer or a paddle stirrer;

in the step 2, the degree of supersaturation of sparingly-soluble salts in high salinity water entering the crystallization initiation unit is 100% to 400%;

in the step 3, the crystallization termination unit comprises a feeding device and a stirring device; in accordance with water quality of the raw water and process requirements, crystallization terminating agent comprises lime, sodium carbonate, sodium hydroxide, trisodium phosphate and/or disodium hydrogen phosphate; and, the feeding device is a manipulator, a hopper or a convertor belt, or the softening agent and the flocculating agent are prepared into a solution and then added by a pump;

in the step 4, the mechanical filter unit is an ultra filtration membrane, a microfiltration membrane, a high-density sedimentation tank and a sand filter, or combinations thereof;

in the step 1 and step 6, membrane element used in the membrane concentration units is a nanofiltration membrane element or reverse osmosis membrane element, and the type of the membrane element is spiral-wound type or disc-tube type; and, the ratio of the salinity water flowing back to the salinity water discharged in the second membrane concentration unit is 1:1~5:1.

The crystallization termination unit adopts adding softening agent, flocculation and sedimentation;

the ratio of the salinity water flowing back to the salinity water discharged in the second membrane concentration unit is 1:1~5:1;

the sparingly-soluble inorganic salts in the high salinity water are calcium sulfate, magnesium sulfate, calcium carbonate or magnesium hydroxide.

A system for treating high salinity water, used to execute the method for treating high salinity water, comprising a crystallization initiation unit and a crystallization termination unit which are successively linked in working procedure;

the crystallization initiation unit in which a seed crystal used for initiating crystallization of supersaturated sparingly-soluble salts is added, is provided with an inlet for introducing pretreated raw water, and is further provided with an outlet for discharging crystals precipitated and an outlet for discharging resulting water obtained after precipitating crystals;

the crystallization termination unit, comprises a feeding device for adding materials for precipitating miscellaneous salts, and is provided with an inlet for introducing the resulting water obtained after precipitating crystals and further provided with at least two outlets; one of the outlets is used for discharging precipitated miscellaneous salts, and the other outlets is used for discharging resulting water obtained after precipitating miscellaneous salts.

As a further improvement of the above technical solution:

a first membrane concentration unit is arranged before the crystallization initiation unit;

a mechanical filter unit, an online mixer and a second membrane concentration unit are successively arranged behind the crystallization termination unit;

the first membrane concentration unit in which a scale inhibitor is added, and the first membrane concentration unit has at least two outlets; after the concentration treatment of the first membrane concentration unit, one of the outlets discharges resulting water, and the other outlets discharges concentrated water in the first membrane concentration unit for mixing with concentrated water discharged from the second membrane concentration unit;

the crystallization initiation unit is provided with a seed crystal feeding port and a crystal stirring device, the inlet of the crystallization initiation unit introducing liquid obtained after mixing the concentrated water from the first membrane concentration unit and the concentrated water from the second membrane concentration unit;

the crystallization termination unit is further provided with a stirring device and a feeding device for feeding materials such as a softening agent and/or a flocculating agent; in accordance with water quality of the raw water and process requirements, crystallization terminating agent comprises lime, sodium carbonate, sodium hydroxide, trisodium phosphate or disodium hydrogen phosphate; the feeding device is a manipulator, a hopper, a convertor belt or a delivery pump;

the mechanical filter unit, for removing crystal particles and suspended matters in salinity water discharged from the crystallization termination unit;

a pipeline for concentrated water of the second membrane concentration unit, of which an inlet is connected to an outlet of the mechanical filter unit; an outlet of the pipeline for concentrated water of the second membrane concentration unit is divided at least two path; one of the outlets is connected to a next-stage concentrator, and the other outlets is connected to a pipeline for concentrated water of the first membrane concentration unit;

the online mixer used for feeding scale inhibitor is arranged between the mechanical filter and the second membrane concentration unit.

In the first membrane concentration unit and the second membrane concentration unit, membrane elements of the membrane concentration units adopt nanofiltration membrane elements or reverse osmosis membrane elements;

a feeding port for feeding scale inhibitor is formed on the online mixer;

the mechanical filter adopts an ultrafiltration membrane, a microfiltration membrane, a high-density sedimentation tank and a sand filter, or combinations thereof.

Each of the units is connected by pipelines;

the membrane element is of spiral-wound type or disc-tube type.

The pore size of the ultrafiltration membrane range from 0.05 to 0.1 μm; while, the pore size of the microfiltration membrane ranges from 0.1 to 0.4 μm.

Compared with the prior art (e.g., CN108623034A, etc.), the present application mainly differs in that, in the present application, crystallization is initiated by crystal seeding method, and a crystallization initiation region and a crystallization termination region are divided as two independent regions. Since crystallization initiated by crystal seeding method is selective, high-purity crystals with additional value can be obtained in a crystallization initiation unit. Crystallization can be terminated just by adding a small amount of a softening agent in a crystallization termination unit, and the degree of supersaturation of sparingly-soluble salts in the salinity water is reduced to below 100%, during this process, only a small amount of miscellaneous salts to be discharged as sludge is produced. However, in CN108623034A, the inorganic salts in the concentrated solution are precipitated by directly adding a flocculating agent and a softening agent, a large amount of the softening agent and the flocculating agent will be used in this method, the precipitated inorganic salts are almost present in the form of miscellaneous salts, and the miscellaneous salts are useless and can only be further treated as solid wastes.

In the present application, crystallization initiated by crystal seeding method is innovatively combined with a membrane system, and the concentrated water is softened before entering the membrane system, ensuring that the salinity water can be highly concentrated in the membrane system without forming scales. The highly-concentrated water is flow back before the crystallization initiation unit and mixed with the concentrated water from the first membrane concentration unit, so it ensured that the concentrated water entering the crystallization unit has a high degree of supersaturation, the concentrating process of the concentrated water before the crystallization initiation unit is reduced, and the system investment is reduced. Since crystallization and softening processes are performed at different stages, the deep softening effect can be achieved just by adding a small amount of the softening agent in the softening stage, so that the cost for agents is greatly reduced, and the amount of sludge produced is decreased, it is ensured that the membrane concentrator can highly concentrate the salinity water, and the TDS of the salinity water entering a next-stage system can reach 80000 to 120000 ppm or even 130000 ppm in extreme cases.

DETAILED DESCRIPTION OF THE PRESENT INVENTION

In the following, the present application will be described in detail through exemplary implementations. However, it should be understood, without further recitation, the elements, structure and features in one implementation may be beneficially combined in other implementations without further recitation.

In the description of the present application, it is to be noted that terms "first", "second" are used for descriptive purposes and should not be interpreted to indicate or imply the relative importance. In addition, the term "and/or" in the implementations of this application describes only an association relationship between associated objects and represents that three relationships may exist. For example, A and/or B may represent the following three cases: only A exists, both A and B exist, and only B exists. In addition, the character "/" in this specification usually indicates an "or" relationship between associated objects.

Figure 1:
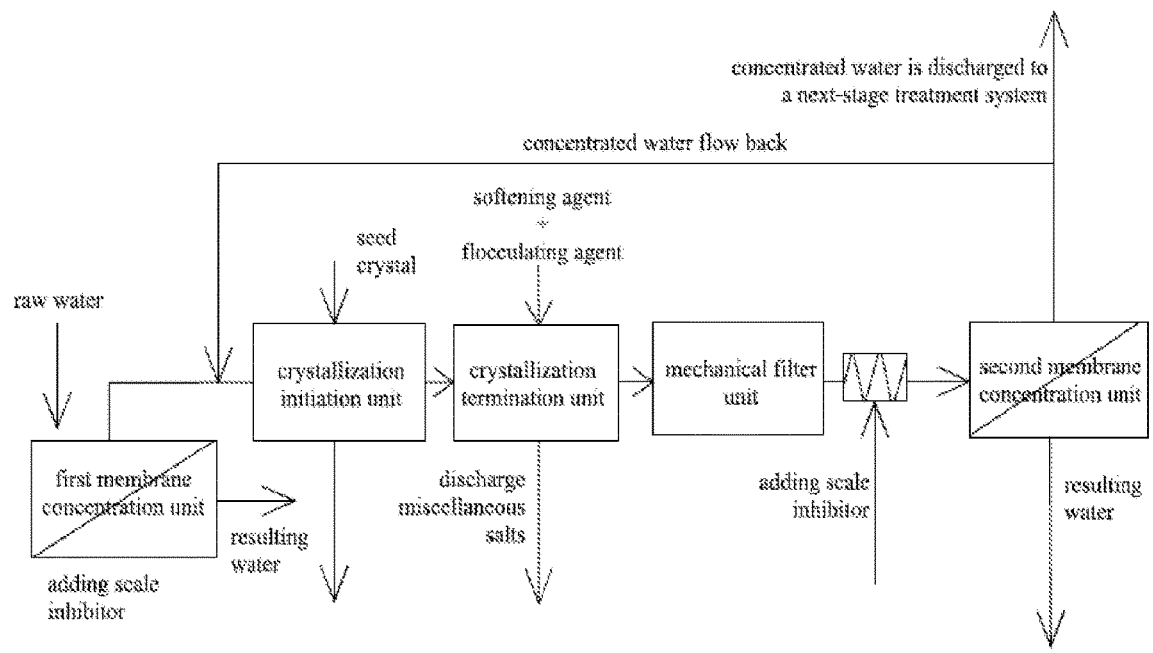
FIG. 1 is a schematic structure diagram of the method and system of one implementation according to the present application.

As shown in FIG. 1, the method for treating high salinity water in this implementation comprises the following steps. Firstly, raw water after pretreated is introduced, and crystallization of the raw water is initiated by crystal seeding method. Then, precipitated crystals are discharged, and resulting water obtained after precipitating crystals is introduced to a next procedure. Thirdly, introduce the resulting water obtained after precipitating crystals, and perform miscellaneous salts precipitation treatment. Subsequently, precipitated miscellaneous salts are discharged, and resulting water obtained after precipitating miscellaneous salts is introduced to a next procedure.

Specifically, in one implementation, the method may comprise the following steps.

Step 1: Pretreatment is performed by a first membrane concentration unit, and the raw water is concentrated until degree of supersaturation is more than 100%.

Step 2: With the assistance of a crystallization initiation unit, firstly, the raw water concentrated in the step 1 is mixed and introduced into the crystallization initiation unit; then, crystallization is initiated by crystal seeding method; and, the precipitated crystals are discharged.

Step 3: With the assistance of a crystallization termination unit, firstly, resulting water of the crystallization initiation unit obtained after the treatment of the step 2 is introduced into the crystallization termination unit; then, a softening agent and/or a flocculating agent is added to terminate crystallization process and the degree of supersaturation is decreased to below 100%; secondly, the precipitated miscellaneous salts are discharged.

Step 4: With the assistance of a mechanical filter unit, liquid discharged from the crystallization termination unit in the step 3 flows through the mechanical filter unit, residual seed crystal and floccules are removed, and salinity water is discharged.

Step 6: With the assistance of a second membrane concentration unit, salinity water after treatment of the step 5 enters the second membrane concentration unit for concentration.

Step 5 is provided between the step 4 and step 6. In the step 5, with the assistance of an online mixer, a scale inhibitor is added in an online mixing manner; firstly, the scale inhibitor is added into the salinity water discharged from the mechanical filter unit in the step 4; and then, the step 6 is executed.

In the step 6, the salinity water is concentrated by the second membrane concentration unit and then divided into at least two paths; one path of the salinity water is flow back before the crystallization initiation unit and mixed with concentrated water from the first membrane concentration unit in the step 1, and the other path of the salinity water is discharged into a next-stage concentration system or an evaporation pool.

In the step 2, crystallization process is initiated by a crystal seeding method, and the crystallization initiation unit comprises a seed crystal feeding port and a crystal stirring device; the particle size of the added seed crystal ranges from 200 to 1200 mesh; and, the crystal stirring device is a helical ribbon stirrer, an anchor stirrer, a turbine stirrer or a paddle stirrer.

In the step 2, the degree of supersaturation of sparingly-soluble salts in high salinity water entering the crystallization initiation unit is 100% to 400%. That is, after the pretreatment of the first membrane concentration unit, in the raw water, the degree of supersaturation of the sparingly-soluble salts is 100% to 400%, the raw water has become the high salinity water.

In the step 3, the crystallization termination unit comprises a feeding device and a stirring device; in accordance with water quality of the raw water and process requirements, crystallization terminating agent comprises lime, sodium carbonate, sodium hydroxide, trisodium phosphate and/or disodium hydrogen phosphate; and, the feeding device is a manipulator, a hopper or a convertor belt, or the softening agent and the flocculating agent are prepared into a solution and then added by a pump.

In the step 4, the mechanical filter unit is an ultra filtration membrane, a microfiltration membrane, a high-density sedimentation tank and a sand filter, or combinations thereof.

In the step 1 and step 6, membrane elements used in the membrane concentration units are nanofiltration membrane elements or reverse osmosis membrane elements, and the type of the membrane element is spiral-wound type or disc-tube type; and, the ratio of the salinity water flowing back to the salinity water discharged in the second membrane concentration unit is 1:1~5:1. That is, in step 6, the ratio of the salinity water mixing with the concentrated water obtained in step 1 to the salinity water discharged into a next-stage is 1:1~5:1.

The crystallization termination unit may adopt method of softening, flocculation and sedimentation;

the ratio of the salinity water flowing back to the salinity water discharged in the second membrane concentration unit is 1:1~5:1;

the sparingly-soluble salts in the high salinity water are calcium sulfate, magnesium sulfate, calcium carbonate or magnesium hydroxide.

The system for treating high salinity water in this implementation is used to execute the method for treating high salinity water, and comprises a crystallization initiation unit 1 and a crystallization termination unit 2 which are successively linked in working procedure.

The crystallization initiation unit 1 in which a seed crystal used for initiating crystallization of supersaturated sparingly-soluble salts is added, is provided with an inlet 101 for introducing pretreated raw water, and is further provided with an outlet 102 for discharging crystals precipitated and an outlet 103 for discharging resulting water obtained after precipitating crystals.

The crystallization termination unit 2, comprises a feeding device 21 for adding materials for precipitating miscellaneous salts, and is provided with an inlet 201 for introducing the resulting water obtained after precipitating crystals and further provided with at least two outlets; one of the outlets 202 is used for discharging precipitated miscellaneous salts, and the other outlets 203 is used for discharging resulting water obtained after precipitating miscellaneous salts.

A first membrane concentration unit 3 is arranged before the crystallization initiation unit 1;

a mechanical filter unit 4, an online mixer 5 and a second membrane concentration unit 6 are successively arranged behind the crystallization termination unit 2;

the first membrane concentration unit 3 in which the scale inhibitor is added, and the first membrane concentration unit has at least two outlets 301, 302; after concentration treatment of the first membrane concentration unit, one of the outlets 301 discharges resulting water, and the other outlets 302 discharges concentrated water in the first membrane concentration unit, which is to be mixed with concentrated water discharged from the second membrane concentration unit 6;

the crystallization initiation unit 1 is provided with a seed crystal feeding port 11 and a crystal stirring device 12, the inlet 101 of the crystallization initiation unit is to introduce liquid obtained after mixing the concentrated water from the first membrane concentration unit 3 and the concentrated water from the second membrane concentration unit 6;

the crystallization termination unit 2 is further provided with a stirring device 22 and a feeding device 21 for feeding materials such as a softening agent and/or a flocculating agent; in accordance with water quality of the raw water and process requirements, crystallization terminating agent comprises lime, sodium carbonate, sodium hydroxide, trisodium phosphate or disodium hydrogen phosphate; the feeding device 21 is a manipulator, a hopper, a convertor belt or a delivery pump;

the mechanical filter unit 4, for removing crystal particles and suspended matters in salinity water discharged from the crystallization termination unit 2;

a pipeline 7 for concentrated water of the second membrane concentration unit 6, that is the pipeline for the concentrated water obtained by the treatment of the second membrane concentration unit passing through, of which an inlet 601 is connected to an outlet 401 of the mechanical filter unit 4; an outlet of the pipeline for concentrated water of the second membrane concentration unit is divided at least two; one of the outlets 701 is connected to a next-stage concentrator, and the other outlets 702 is connected to a pipeline 8 for concentrated water of the first membrane concentration unit 3;

the online mixer 5 used for feeding scale inhibitor is arranged between the mechanical filter 4 and the second membrane concentration unit 6.

Figure 2:
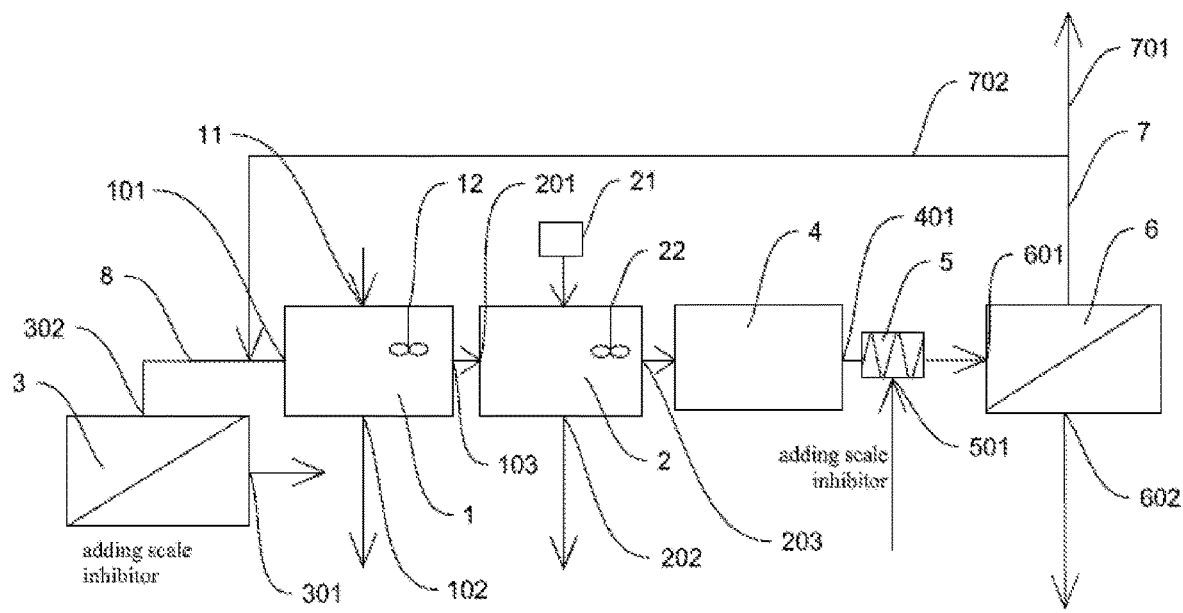
FIG. 2 is a schematic structure diagram of the method and system of one implementation according to the present application.

For the crystallization termination unit, the feeding device for feeding materials such as a softening agent and/or a flocculating agent and the feeding device for adding materials for precipitating miscellaneous salts may be the same one which can be seen from FIG. 2, or two independent feeding devices.

The second membrane concentration unit 6 is further provided with an outlet 602 for discharges the resulting water obtained after the treatment of this unit.

In the first membrane concentration unit 3 and the second membrane concentration unit 6, membrane elements may adopt nanofiltration membrane elements or reverse osmosis membrane elements;

a feeding port 501 for feeding scale inhibitor is formed on the online mixer;

the mechanical filter 4 may adopt an ultrafiltration membrane, a microfiltration membrane, a high-density sedimentation tank and a sand filter, or combinations thereof.

Each of the units is connected by pipelines.

The membrane element is of spiral-wound type or disc-tube type.

The pore size of the ultrafiltration membrane range from 0.05 to 0.1 μm; and the pore size of the microfiltration membrane ranges from 0.1 to 0.4 μm.

Specifically, the present application provides a method for treating high salinity water. The method comprises providing an independent crystallization initiation unit and an independent crystallization termination unit, the crystallization condition is explicitly defined as crystal seeding method, and the crystallization is initiated by adding a seed crystal; the particle size of the seed crystal ranges from 200 to 1200 mesh, preferably 400 to 1000 mesh; the temperature of the crystallization initiation unit is controlled to be 10° C. to 40° C. In the crystallization termination unit, by adding the softening agent and the flocculating agent, the crystallization initialized by the seed crystal is terminated, and the hardness of the resulting water is also reduced. The softening agent selected is one of or a combination of sodium carbonate, sodium hydroxide and calcium hydroxide, and the temperature of the crystallization termination unit is controlled to be 10° C. to 40° C. The inorganic salt contained in the concentrated water may be one of or a combination of calcium sulfate, magnesium sulfate, calcium carbonate and magnesium hydroxide. The mechanical filter in the present application may be an ultrafiltration membrane, a microfiltration membrane, a high-density sedimentation tank and a sand filter, or combinations thereof, the specific selection of the mechanical filter may be comprehensively considered according to the occupied area of the project, etc. The resulting water of the crystallization termination unit should be added with the scale inhibitor before entering the second membrane concentration unit; the scale inhibitor can be added before or after the mechanical filter, preferably after the mechanical filter; the concentration of the added scale inhibitor is 1 to 50 ppm, preferably 10 to 20 ppm. The first membrane concentration unit and the second membrane concentration unit may adopt nanofiltration membranes or reverse osmosis membranes, and the structure type of the membrane element is spiral-wound type or disc-tube type. Since the disc-tube type membrane elements have low requirements on the intaking water and have high scaling and pollution resistance, the disc-tube type reverse of osmosis membrane and nanofiltration membrane elements are preferred. If the system is required to have a certain salt separation function, a nanofiltration membrane is preferred; and, if the liquid to be treated is relatively simple in composition, the system is not required to permeate monovalent salts alone, so a reverse osmosis membrane with higher concentration efficiency is preferred. In the present application, the crystals obtained in the crystallization initiation unit are high in purity, and can be discharged, dried and packaged. A small amount of miscellaneous salts is obtained by the crystallization termination unit, and the miscellaneous salts are discharged and treated as solid wastes. The operating pressure of the membrane concentration unit is 1 MPa to 6 MPa; the operating pressure depends upon the concentration and the concentration rate of the high salinity water entering the membrane concentration unit. The operating temperature of the spiral-wound type membrane element is 5° C. to 45° C., while the operating temperature of the disc-tube type membrane element is 5° C. to 60° C., the operating temperature is preferably 20° C. to 35° C. The ratio of the backflow water to the discharged water of the concentrated water in the second membrane concentration unit is 1:1 to 5:1, preferably 2:1 to 4:1.

The system of the present application comprises: a first membrane concentration unit for concentrating the raw water, and a crystallization initiation unit for feeding a seed crystal, the raw water entering the crystallization initiation device is mixed liquid of the concentrated water from the first membrane concentration unit and part of the concentrated water from the second membrane concentration unit; a crystallization termination unit, which comprises a device for feeding the softening agent and the flocculating agent and is used for terminating the crystallization initiated by a seed crystal and softening the concentrated water; a mechanical filter unit for removing crystals and suspended matters in the resulting water of the crystallization termination unit; a scale inhibitor online mixer for feeding scale inhibitor before the concentrated water enters the membrane system; and, a second membrane concentration unit in which part of the concentrated water flows back to the crystallization initiation unit and part of the concentrated water is discharged to a next-stage treatment system. The TDS (total dissolved solids) of the concentrated water entering a next-stage concentrator after being concentrated by the membrane system may reach 80000 to 120000 ppm, so that the treatment process is greatly shortened and the energy consumption is saved.

The high salinity water entering the crystallization initiation unit contains part of the concentrated water produced by the second membrane concentration unit to improve the degree of supersaturation of sparingly-soluble salts in the concentrated water, so that the cost required for deep concentration of the salinity water before the crystallization initiation unit is reduced; a crystallization termination operation needs to be performed on the resulting water of the crystallization initiation unit; the crystallization is terminated by adding the softening agent such as calcium oxide or calcium hydroxide and the flocculating agent, and the salinity water is softened. The water from the crystallization termination unit needs to be mechanically filtered to prevent crystals and suspended matters from polluting the membrane concentration system.

Embodiment

Raw water is treated by a first membrane concentration unit to obtain 70 T/h of high-salinity wastewater having a degree of calcium sulfate supersaturation of 130%; the high-salinity wastewater is mixed with 20 T/h of concentrated water having a degree of calcium sulfate supersaturation of 350% from a membrane system to obtain 90 T/h of mixed water having a degree of calcium sulfate supersaturation of 179%; the mixed water is introduced into a crystallization initiation unit, and a seed crystal calcium sulfate dehydrate in 500 mesh is added; and the mixed water is stirred with a helical ribbon stirrer at 50 rpm. Calcium sulfate crystals are discharged, dried and then packaged.

The degree of supersaturation of calcium sulfate in the resulting water in the crystallization initiation unit is 110%, and the flow is 90 T/h (tons per hour).

The resulting water of the crystallization initiation unit enters a crystallization termination unit, a solution of calcium hydroxide having a mass concentration of 5% and polyacrylamide in 40 ppm is added and stirred by a helical ribbon stirrer at 40 rpm, and miscellaneous salts are precipitated and discharged. The degree of supersaturation of calcium sulfate in the resulting water from the crystallization to termination unit is reduced to 100%.

The resulting water in the crystallization termination unit is filtered by an ultrafilter having a pore size of 0.05 μm and then added with a scale inhibitor of 5 ppm online, and then enters the second membrane concentration unit.

90 T/h of the concentration salinity water enters a DTRO (Disc-Tube Reverse Osmosis) system, that is a second membrane concentration unit having a recovery rate of 71.4%, to obtain 64.3 T/h of resulting water having a hardness of 0, and 25.6 T/h of concentrated water having a degree of calcium sulfate supersaturation of 350%, 20 T/h of the concentrated water is flow back before the crystallization initiation unit to mixed with the raw water, and 5.6 T/h of the concentrated water is discharged to a next-stage treatment system.

The present application is reasonable in design, low in cost, firm and durable, safe and reliable, simple in operation, compact in stricture, and convenient for automatic control.

The invention claimed is:

1. A method for treating high salinity water, comprising: firstly, introducing raw water after pretreatment, and initiating crystallization of the raw water by crystal seeding method; then, discharging precipitated crystals, and introducing first resulting water obtained after precipitating crystals to a next procedure; thirdly, introducing the first resulting water obtained after precipitating crystals, and performing salts precipitation treatment; subsequently, discharging precipitated salts, and introducing second resulting water obtained after precipitating salts to another next procedure; the method specifically comprising:

Step 1: performing pretreatment by a first membrane concentration unit and concentrating the raw water until degree of supersaturation is more than 100%;

Step 2: with the assistance of a crystallization initiation unit, firstly, mixing and then introducing the raw water concentrated in the step 1 into the crystallization initiation unit; then, initiating crystallization by a seed crystal; and, discharging the precipitated crystals;

Step 3: with the assistance of a crystallization termination unit, firstly, introducing the first resulting water of the crystallization initiation unit obtained after the treatment of the step 2 into the crystallization termination unit; then, adding a crystallization terminating agent to terminate crystallization and decreasing the degree of supersaturation to below 100%; secondly, discharging the precipitated salts;

Step 4: with the assistance of a mechanical filter unit, liquid discharged from the crystallization termination unit in the step 3 flowing through the mechanical filter unit, removing residual seed crystal and floccules, and discharging salinity water, wherein the liquid discharged from the crystallization termination unit in the step 3 is the second resulting water;

Step 5: with the assistance of an inline mixer, adding a first scale inhibitor in an inline mixing manner into the salinity water discharged from the step 4;

Step 6: with the assistance of a second membrane concentration unit, salinity water after treatment of the step 5 entering the second membrane concentration unit for concentration.

2. The method for treating high salinity water of claim 1, wherein in the step 6, the salinity water is concentrated by the second membrane concentration unit and then divided into at least a first path and a second path; the first path of the salinity water flows back before the crystallization initiation unit and is mixed with concentrated water from the first membrane concentration unit in the step 1, and the second ether path of the salinity water is discharged into a next-stage concentration system or an evaporation pool;

in the step 2, crystallization is initiated by the seed crystal, and the crystallization initiation unit comprises a seed crystal feeding port and a crystal stirring device; the particle size of the added seed crystal ranges from 200 to 1200 mesh; and, the crystal stirring device is a helical ribbon stirrer, an anchor stirrer, a turbine stirrer or a paddle stirrer;

in the step 2, the degree of supersaturation of sparingly-soluble salts in high salinity water entering the crystallization initiation unit is 100% to 400%;

in the step 3, the crystallization termination unit comprises a feeding device and a stirring device; in accordance with water quality of the raw water and process requirements, the crystallization terminating agent comprises lime, sodium carbonate, sodium hydroxide, trisodium phosphate and/or disodium hydrogen phosphate; and, the feeding device is a manipulator, a hopper or a convertor belt, or the crystallization terminating agent is prepared into a solution and then added by a pump;

in the step 1 and step 6, membrane element used in the membrane concentration units is a nanofiltration membrane element or a reverse osmosis membrane element, and the type of the membrane element is spiral-wound type or disc-tube type; and, the ratio of the first path of the salinity water to the second path of the salinity water.

3. The method for treating high salinity water of claim 2, wherein the crystallization termination unit adopts adding softening agent, flocculation and sedimentation;

the sparingly-soluble salts in the high salinity water are calcium sulfate, magnesium sulfate, calcium carbonate or magnesium hydroxide.

4. A system for treating high salinity water, used to execute the method for treating high salinity water of claim 1, comprising a crystallization initiation unit and a crystallization termination unit which are successively linked in working procedure;

the crystallization initiation unit in which a seed crystal used for initiating crystallization of supersaturated sparingly-soluble salts is added, is provided with an inlet for introducing pretreated raw water, and is further provided with an outlet for discharging crystals precipitated and an outlet for discharging resulting water obtained after precipitating crystals;

the crystallization termination unit, comprises a feeding device for adding materials for terminating crystallization, and is provided with an inlet for introducing the resulting water obtained after precipitating crystals and further provided with at least two outlets; one of the outlets is used for discharging precipitated salts, and the other outlets is used for discharging resulting water obtained after precipitating salts;

a first membrane concentration unit is arranged before the crystallization initiation unit;

a mechanical filter unit, an online inline mixer and a second membrane concentration unit are successively arranged behind the crystallization termination unit;

the first membrane concentration unit in which a second scale inhibitor is added, and the first membrane concentration unit has at least two outlets; after concentration treatment of the first membrane concentration unit, one of the outlets discharges the first resulting water, and the other outlets discharges concentrated water in the first membrane concentration unit for mixing with concentrated water discharged from the second membrane concentration unit;

the crystallization initiation unit is provided with a seed crystal feeding port and a crystal stirring device, the inlet of the crystallization initiation unit is to introduce liquid obtained after mixing the concentrated water from the first membrane concentration unit and the concentrated water from the second membrane concentration unit;

the crystallization termination unit is further provided with a stirring device; in accordance with water quality of the raw water and process requirements, the crystallization terminating agent comprises lime, sodium carbonate, sodium hydroxide, trisodium phosphate or disodium hydrogen phosphate; the feeding device is a manipulator, a hopper, a convertor belt or a delivery pump;

the mechanical filter unit, for removing crystal particles and suspended matters in salinity water discharged from the crystallization termination unit;

a pipeline for concentrated water of the second membrane concentration unit, of which an inlet is connected to an outlet of the mechanical filter unit; an outlet of the pipeline for concentrated water of the second membrane concentration unit is divided into at least two outlets; one of the outlets of the second membrane concentration unit is connected to a next-stage concentrator, and the other of the outlets of the second membrane concentration unit is connected to a pipeline for concentrated water of the first membrane concentration unit;

the inline mixer used for feeding a first scale inhibitor is arranged between the mechanical filter and the second membrane concentration unit.

5. The system for treating high salinity water of claim 4, wherein in the first membrane concentration unit and the second membrane concentration unit, membrane elements adopt nanofiltration membrane elements or reverse osmosis membrane elements; a feeding port for feeding the first scale inhibitor is formed on the inline mixer; the mechanical filter adopts an ultrafiltration membrane, a microfiltration membrane, a high-density sedimentation tank and a sand filter, or combinations thereof.

6. The system for treating high salinity water of claim 5, wherein the crystallization initiation unit, the crystallization termination unit, the first membrane concentration unit, the mechanical filter unit, and the second membrane concentration unit are connected by pipelines;

in the first membrane concentration unit and the second membrane concentration unit, the membrane elements are of spiral-wound type or disc-tube type.

7. The system for treating high salinity water of claim 6, wherein the pore size of the ultrafiltration membrane ranges from 0.05 to 0.1 μm; and the pore size of the microfiltration membrane ranges from 0.1 to 0.4 μm.

* * * * *

UNITED STATES PATENT AND TRADEMARK OFFICE
CERTIFICATE OF CORRECTION

PATENT NO. : 11,046,598 B1
APPLICATION NO. : 17/001465
DATED : June 29, 2021
INVENTOR(S) : Yuebiao Li et al.

It is certified that error appears in the above-identified patent and that said Letters Patent is hereby corrected as shown below:

In the Claims

In Claim 2, Column 12, Lines 41-43, after "the ratio of the first path of the salinity water to the second path of the salinity water", insert: --1:1 - 5:1--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*